US012601940B2

(12) United States Patent
Zhao et al.

(10) Patent No.: US 12,601,940 B2
(45) Date of Patent: Apr. 14, 2026

(54) DISPLAY DEVICE INCLUDING BACK PLATE WITH GROOVE AND ASSEMBLY METHOD THEREFOR

(71) Applicant: SUZHOU CHINA STAR OPTOELECTRONICS TECHNOLOGY CO., LTD., Suzhou (CN)

(72) Inventors: Guanqiao Zhao, Suzhou (CN); Mookeun Shin, Suzhou (CN); Liang Yue, Suzhou (CN); Zhonghong Guan, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/263,346

(22) PCT Filed: May 31, 2023

(86) PCT No.: PCT/CN2023/097614
§ 371 (c)(1),
(2) Date: Jan. 29, 2025

(87) PCT Pub. No.: WO2024/239367
PCT Pub. Date: Nov. 28, 2024

(65) Prior Publication Data
US 2025/0164837 A1       May 22, 2025

(30) Foreign Application Priority Data

May 23, 2023     (CN) .......................... 202310581931.4

(51) Int. Cl.
G02F 1/1333        (2006.01)
F21V 8/00          (2006.01)
(Continued)

(52) U.S. Cl.
CPC ..... *G02F 1/133314* (2021.01); *G02B 6/0083* (2013.01); *G02B 6/0086* (2013.01); (Continued)

(58) Field of Classification Search
CPC ................ G02B 6/0083; G02B 6/0086; G02F 1/133314; G02F 1/133612
See application file for complete search history.

(56) References Cited

U.S. PATENT DOCUMENTS

| | | | | |
|---|---|---|---|---|
| 2009/0073342 A1* | 3/2009 | Jung | ..................... | G02B 6/0081 |
| | | | | 349/60 |
| 2022/0163838 A1* | 5/2022 | Lin | ................... | G02F 1/133512 |
| 2023/0152625 A1* | 5/2023 | Wan | ..................... | G02B 6/0083 |
| | | | | 362/97.1 |

FOREIGN PATENT DOCUMENTS

| | | |
|---|---|---|
| CN | 201383058 Y | 1/2010 |
| CN | 114624911 A | 6/2010 |

(Continued)

OTHER PUBLICATIONS

International Search Report in International application No. PCT/CN2023/097614, mailed on Feb. 22, 2024.

*Primary Examiner* — Keith G. Delahoussaye
(74) *Attorney, Agent, or Firm* — PV IP PC; Peter Stecher; Wei Te Chung

(57) ABSTRACT

The present application provides a display device (01) and an assembly method for display device. The display device (01) includes a backlight module (02), a display panel (03), and a circuit board (22). The backlight module (02) includes a back plate (21) including a first side plate (211), a second side plate (212), and a bottom plate (213). The second side plate (212) is disposed opposite to the first side plate (211). The bottom plate (213) is disposed on a side of the first side plate (211) close to the second side plate (212). A groove body (214) is provided between the bottom plate (213) and
(Continued)

the second side plate (212), the groove body (214) has a groove (A) on a side of the bottom plate (213) away from the display panel (03), and the circuit board (22) is disposed in the groove (A).

17 Claims, 6 Drawing Sheets

(51) Int. Cl.
  *G02F 1/1335* (2006.01)
  *G02F 1/13357* (2006.01)
(52) U.S. Cl.
  CPC .. *G02F 1/133308* (2013.01); *G02F 1/133317* (2021.01); *G02F 1/133325* (2021.01); *G02F 1/133615* (2013.01); *G02F 1/133608* (2013.01); *G02F 1/133612* (2021.01)

(56) References Cited

FOREIGN PATENT DOCUMENTS

| CN | 102645787 | A | 8/2012 |
| CN | 102809841 | A | 12/2012 |
| CN | 103727467 | A | 4/2014 |
| CN | 103836463 | A | 6/2014 |
| CN | 107515490 | A | 12/2017 |
| CN | 108303825 | A | 7/2018 |
| CN | 208255589 | U | 12/2018 |
| CN | 208367382 | U | 1/2019 |
| CN | 209373306 | U | 9/2019 |
| CN | 214669968 | U | 11/2021 |
| CN | 114442216 | A | 5/2022 |
| CN | 217360487 | U | 9/2022 |
| CN | 217639870 | U | 10/2022 |
| JP | 2001109390 | A | 4/2001 |

* cited by examiner

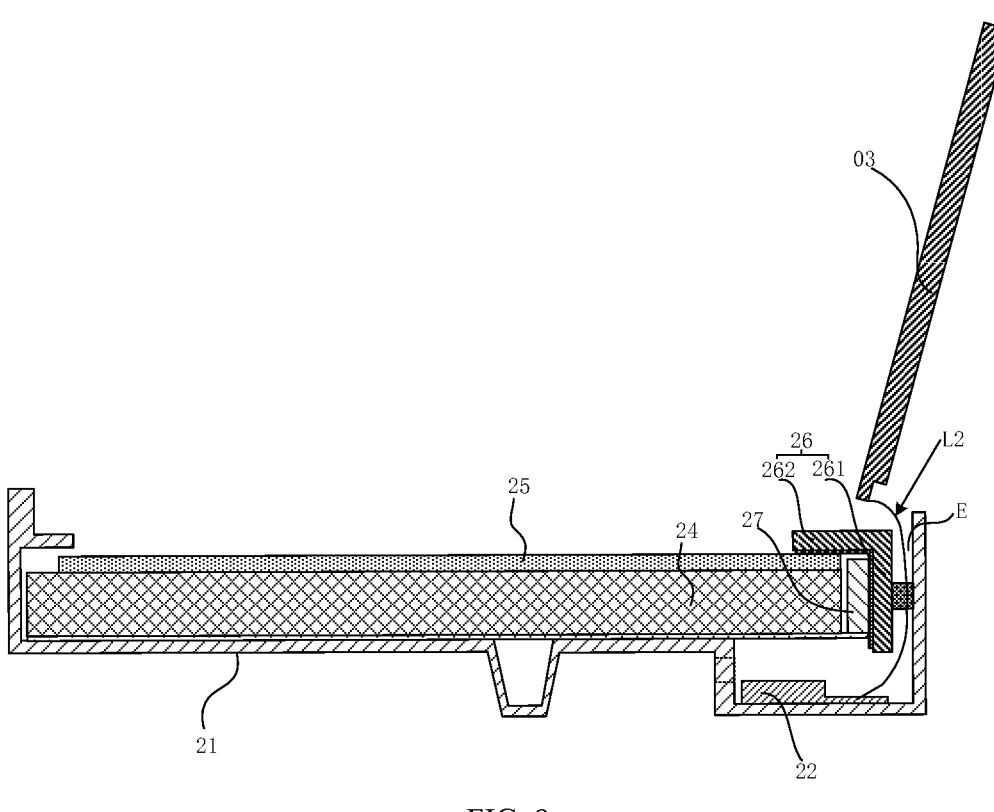
FIG. 8
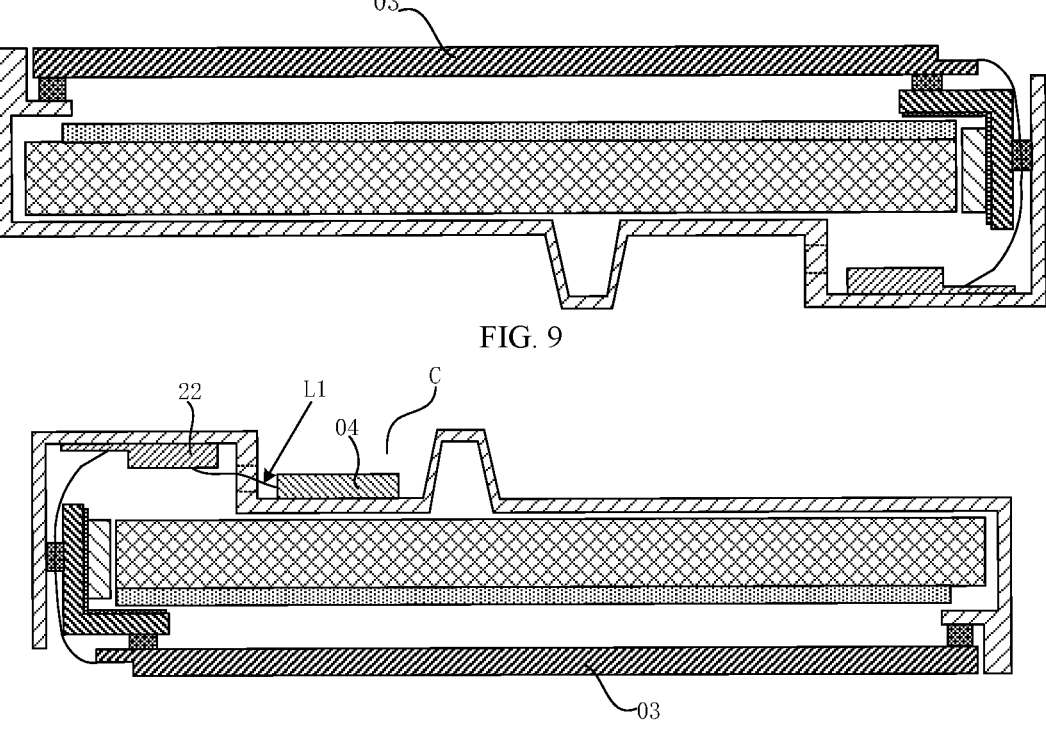
FIG. 9
FIG. 10

DISPLAY DEVICE INCLUDING BACK PLATE WITH GROOVE AND ASSEMBLY METHOD THEREFOR

TECHNICAL FIELD

The present application relates to a field of display technologies, and more particularly, to display device and an assembly method therefor.

BACKGROUND

With development of display technologies, flat panel display devices such as liquid crystal displays (LCD) have high picture quality, power saving, and wide application range. As such, the flat panel display devices are widely used in various consumer electronic products such as mobile phones, televisions, personal digital assistants, digital cameras, notebook computers, and desktop computers, and the like.

In related arts, a liquid crystal display device includes a backlight module and a display panel, the backlight module is used to provide a area light for the display panel, and the backlight module has a complex structure and a wide variety of materials. Thus, the display device is relatively thick, and has a relatively high cost on processing and assembly. This needs to be solved.

SUMMARY

The present application provides a display device and an assembly method therefor, which can effectively solve a problem that the display device is thick, and has a high cost on processing and assembly.

In an aspect, the present application provides a display device, wherein the display device includes a backlight module, and a display panel disposed on a light-emitting side of the backlight module; wherein the backlight module includes a back plate including: a first side plate; a second side plate disposed opposite to the first side plate; a bottom plate provided on a side of the first side plate close to the second side plates and fixedly connected to the first side plate; and a groove body provided between the bottom plate and the second side plate, wherein the groove body is fixedly connected with the bottom plate and the second side plate, respectively, the groove body has a groove on a side of the bottom plate away from the display panel; wherein the backlight module further includes a circuit board, the circuit board is electrically connected with the display panel, and the circuit board is disposed in the groove.

In an embodiment, the groove body includes: a first side wall extending from an end of the bottom plate and extending away from the display panel; a second side wall extending from an end of the second side plate and extending away from the display panel; and a bottom wall fixedly connecting the first side wall and the second side wall; wherein the circuit board is fixed on a surface of a side of the bottom wall close to of the display panel, and the surface of the side of the bottom wall close to the display panel is parallel to the display panel.

In an embodiment, the display device further includes a driving board provided on a side of the back plate away from the display panel, and the circuit board and the driving board are electrically connected by a first connection line; wherein the driving board is positioned on a side of the first side wall away from the second side wall, the first side wall is provided with a through-hole, and the first connection line passes through the through-hole.

In an embodiment, the back plate further includes a projection provided on a side of the bottom plate away from the display panel, and the projection is positioned on a side of the driving board away from the first side wall; wherein the projection, the first side wall, and a bottom plate between the projection and the first side wall define a receiving space, and the driving board is disposed in the receiving space.

In an embodiment, the projection includes a support plate, a distance between the support plate and a plane in which the display panel is positioned is equal to a distance between the bottom wall and the plane in which the display panel is positioned; wherein the display device further includes a base, the base includes a driving cover plate, an orthographic projection of the driving cover plate on the driving board covers the driving board, and the driving cover plate is fixedly connected with the support plate and the bottom wall, respectively.

In an embodiment, the base further includes a bracket integrally formed with the driving cover plate.

In an embodiment, the bracket includes a first bracket and a second bracket, the first bracket is fixedly connected with the driving cover plate and the second bracket, and a slide rail is provided on the second bracket; wherein the display panel further includes a support rod, an end of the support rod is rotatably connected to the first bracket, and another end of the support rod is slidable in the slide rail.

In an embodiment, the backlight module further includes: a reflective sheet disposed on a side of the bottom plate close to the display panel; a light-guiding plate disposed on a side of the reflective sheet close to the display panel; an optical film disposed on a side of the light-guiding plate close to the display panel; and a middle frame including a first portion and a second portion, wherein the first portion is disposed between the light-guiding plate and the second side plate, and the second portion is disposed on a side of the optical film close to the display panel; and a light bar fixed on a side of the first portion close to the light-guiding plate; wherein the display panel is fixedly connected with the first side plate and the second portion, respectively; a second connection line is provided at an end of the display panel close to the second side plate; a gap is defined between the first portion and the second side plate; and the second connection line passes through the gap to electrically connect with the circuit board.

In an embodiment, the first side plate, the second side plate, the bottom plate and the groove body are integrally formed.

In another aspect, the present application provides an assembly method for display device including:

providing a back plate, wherein the back plate includes a first side plate, a second side plate disposed opposite to the first side plate, a bottom plate, and a groove body; the bottom plate is provided on a side of the first side plate close to the second side plate and is fixedly connected to the first side plate; the groove body is provided between the bottom plate and the second side plate, and is fixedly connected to the bottom plate and the second side plate, respectively; the groove body has a groove on a side of the bottom plate away from the display panel;

providing a circuit board electrically connected to the display panel in the groove;

providing a reflective sheet on a side of the bottom plate away from the circuit board;

stacking a light-guiding plate and an optical film sequentially on a side of the reflective sheet away from the bottom plate;

providing a middle frame including a first portion and a second portion, wherein a light bar is fixed to the first portion, the first portion of the middle frame is disposed on a side of the light-guiding plate away from the first side plate, and the second portion of the middle frame is fixed on a side of the optical film away from the light-guiding plate, and the light bar is positioned between the first portion and the light-guiding plate;

fixing the display panel to sides of the first side plate and the second portion away from the bottom panel;

providing a driving board on a side of the bottom plate away from the display panel, and electrically connecting the driving board to the circuit board; and providing a base on a side of the driving board away from the bottom plate, wherein the base includes an integrally formed structure of a driving cover plate and a bracket, and the driving cover plate is fixedly connected to the back plate.

Beneficial Effect

The present application provides a display device and an assembly method for display device. The display device includes a backlight module, and a display panel provided on a light-emitting side of the backlight module. The backlight module includes a back plate including a first side plate, a second side plate, and a bottom plate. The second side plate is disposed opposite the first side plate. The bottom plate is provided on a side of the first side plate close to the second side plate, and is fixedly connected to the first side plate. The groove body is provided between the bottom plate and the second side plate, and is fixedly connected to the bottom plate and the second side plate, respectively. The groove body has a groove on a side of the bottom plate away from the display panel. The backlight module further includes a circuit board disposed in the groove. According to the display device provided in the present application, since the back plate includes the groove body, and the circuit board is directly disposed in the groove of the groove body, it is possible to reduce the number of components in the backlight module, reduce the assembly cost, and reduce the thickness of the display panel.

BRIEF DESCRIPTION OF THE DRAWINGS

In order that the technical solution in the embodiments of the present application may be explained more clearly, reference is made briefly to the accompanying drawings required for the description of the embodiments. It should be understood that the accompanying drawings in the following description are merely some of the embodiments of the present application, and other drawings may be obtained by those skilled in the art without any inventive effort.

FIG. 8 is a schematic diagram of a structure corresponding to step S05 of an assembly method for a display device according to an embodiment of the present application.

FIG. 9 is schematic diagram of a structure corresponding to step S06 of an assembly method for a display device according to an embodiment of the present application.

FIG. 10 is a schematic diagram of a structure corresponding to step S07 of an assembly method for a display device according to an embodiment of the present application.

Figure 1:
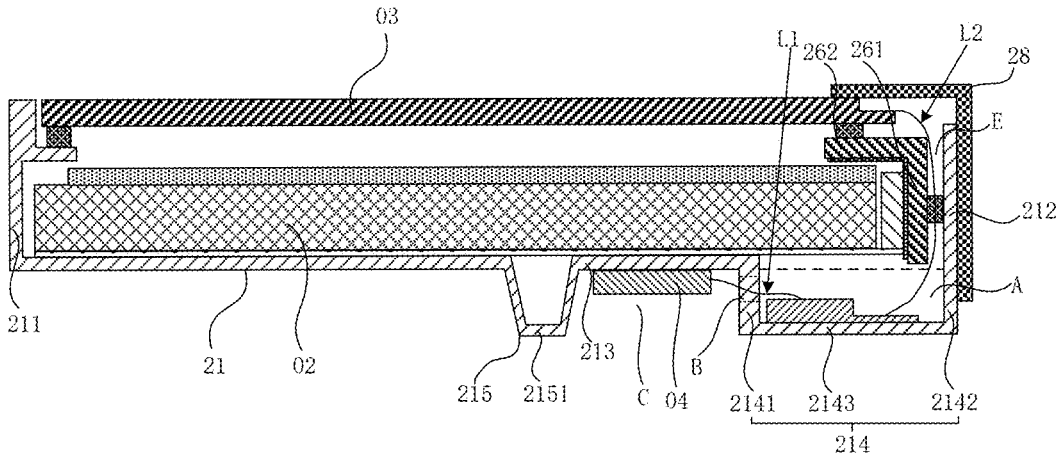
FIG. 1 is a schematic diagram showing positions of a backlight module, a display panel and a driving board in a display device according to an embodiment of the present application.

REFERENCE NUMERALS display device 01; backlight module 02; back plate 21; first side plate 211; second side plate 212; bottom plate 213; groove body 214; first side wall 2141; second side wall 2142; bottom wall 2143; projection 215; support plate 2151; circuit board 22; reflective sheet 23; light-guiding plate 24; optical film 25; middle frame 26; first portion 261; second portion 262; light bar 27; front frame 28; display panel 03; driving board 04; base 05; driving cover plate 51; bracket 52; first bracket 521; second bracket 522; first connection line L1; second connection line L2; support rod M1; groove A; through-hole B; receiving space C; slide rail D; gap E

DETAILED DESCRIPTION OF THE EMBODIMENTS

In the following, the technical solutions in the embodiments of the present application will be clearly and completely described in connection with the accompanying drawings. It should be understood that the described embodiments are merely a part of the embodiments of the present application, rather than all the embodiments. Based on the embodiments in the present application, all other embodiments obtained by a person skilled in the art without any inventive effort are within the scope of the present application. Furthermore, it should be understood that the specific embodiments described herein are for purposes of illustration and explanation only and are not intended to limit the application. In the present application, without stating to the contrary, the use of positional terms such as "on" and "under" refer to a position on or under the device in actual use or operation state, of which the direction is shown in the drawings. The terms "in" and "out" refer to a position in and out the outlines of the device.

The following disclosure provides many different embodiments or examples for implementing the different structures of the present application. In order to simplify the disclosure of the present application, components and arrangements of specific examples are described below. They are merely examples and are not intended to limit the application. In addition, same reference numerals and/or reference letters are used in various examples of the present application for the purpose of simplicity and clarity, and they are not used to indicate a relationship between the various embodiments and/or arrangements discussed. In addition, the present application provides examples of various specific processes and materials, but one of ordinary skill in the art could recognize the application of other processes and/or the use of other materials. In the following detailed description, it should be noted that the order in which the following embodiments are described is not intended to limit the preferred order of the embodiments.

Figure 2:
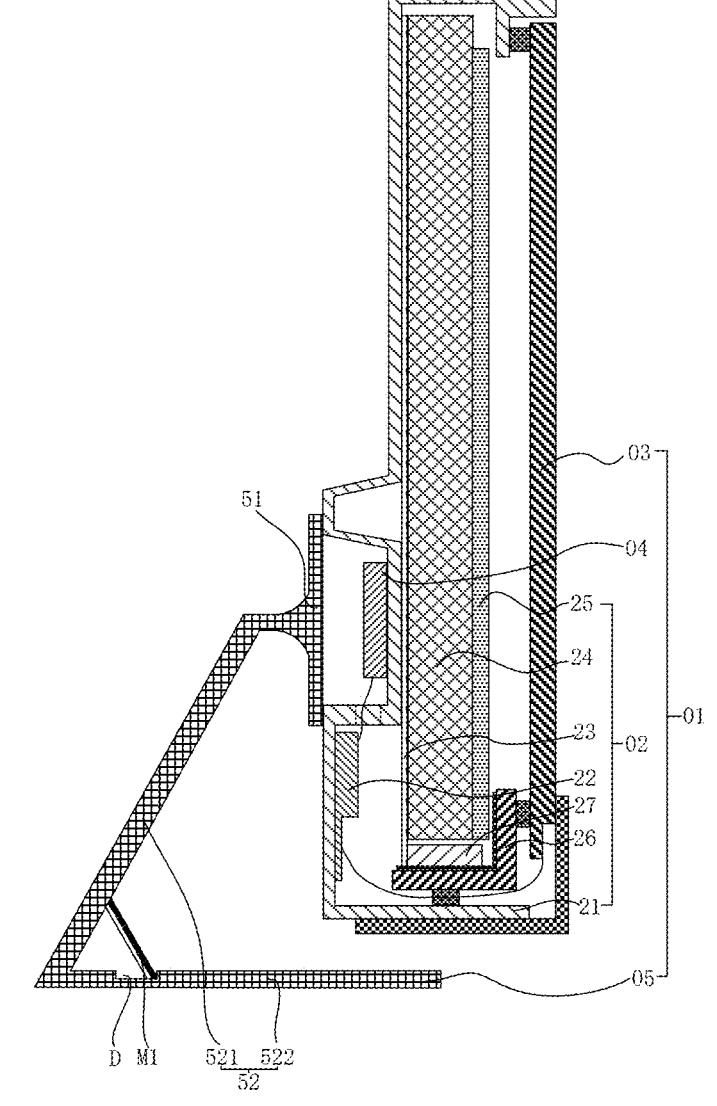
FIG. 2 is a structural schematic diagram of a display device in which a bracket is unfolded according to an embodiment of the present application.
Figure 3:
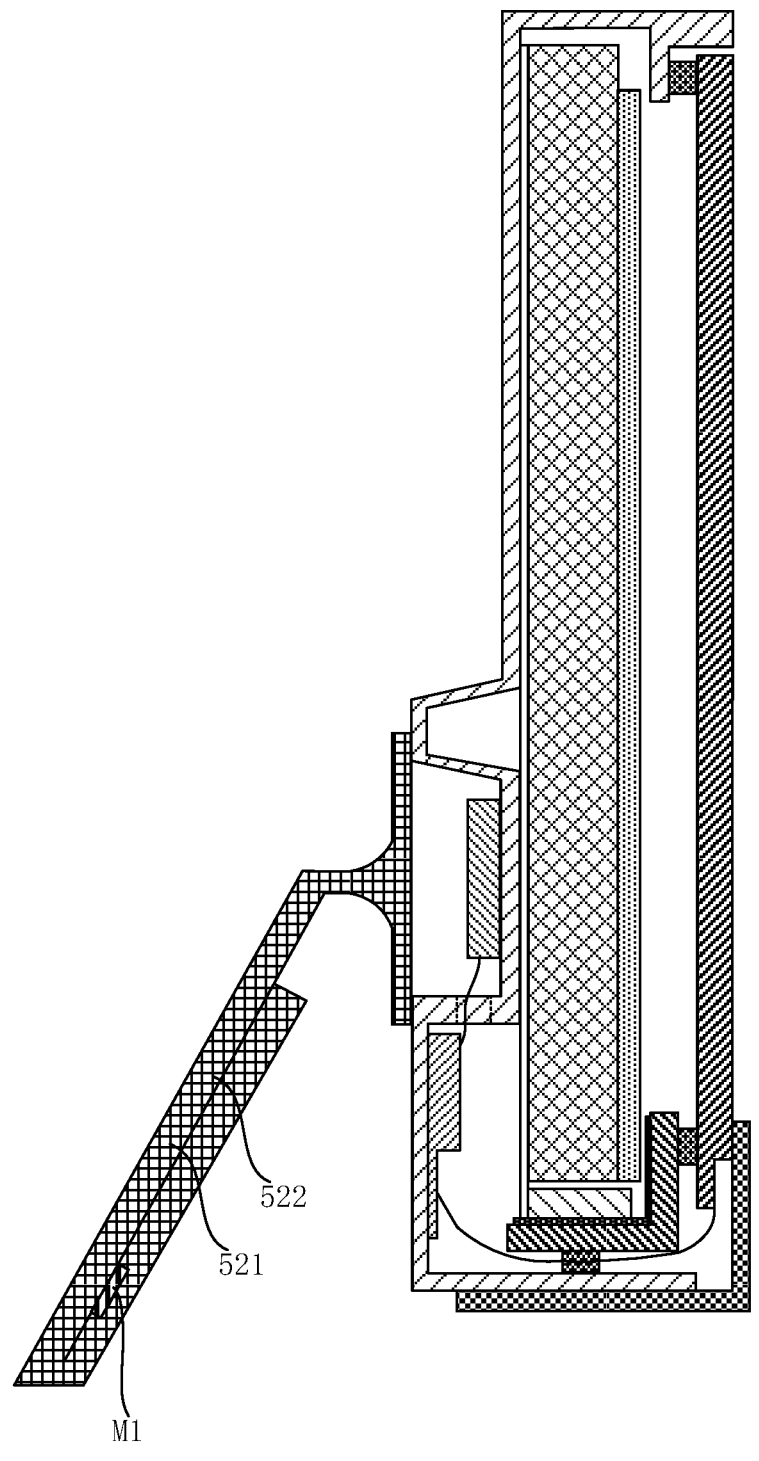
FIG. 3 is a structural schematic diagram of a display device in which a bracket is folded according to an embodiment of the present application.

FIG. 1 is a schematic diagram showing positions of a backlight module, a display panel and a driving board in a display device according to an embodiment of the present application; FIG. 2 is a structural schematic diagram of a display device in which a bracket is unfolded according to an embodiment of the present application; and FIG. 3 is a structural schematic diagram of a display device in which a bracket is folded according to an embodiment of the present application. Referring to FIG. 1 to FIG. 3, according to a first aspect, an embodiment of the present application provides a display device 01 including a backlight module 02 and a display panel 03, wherein the display panel 03 is disposed on a light-emitting side of the backlight module 02, and the backlight module 02 includes a back plate 21. The back plate 21 includes a first side plate 211, a second side plate 212, and a bottom plate 213. The second side plate 212 is disposed opposite to the first side plate 211. The bottom plate 213 is provided on a side of the first side plate 211 close to the second side plate 212, and the bottom plate 213 is fixedly connected to the first side plate 211. The groove body 214 is provided between the bottom plate 213 and the second side plate 212, and the groove body 214 is fixedly connected with the bottom plate 213 and the second side plate 212, respectively. The groove body 214 has a groove A on a side of the bottom plate 213 away from the display panel 03. The backlight module 02 further includes a circuit board 22, and the circuit board 22 is provided in the groove A.

In related arts, a backlight module includes a back plate, and a circuit board electrically connected to a display panel. In order to narrow a frame width of a display device, it is necessary to fold the circuit board back to a side of the back plate away from the display panel. However, for folding the circuit board back, an additional protection structure for the circuit board needs to be provided on a side of the circuit board away from the back plate. As a result, a thickness of the backlight module increases, the number of components for the backlight module increases, and thus, a thickness of the display device increases greatly.

According to the display device 01 provided in the present application, since the back plate 21 includes the groove body 214, the circuit board 22 is directly disposed in the groove A of the groove body 214. It is possible to reduce the number of components in the backlight module 02, reduce cost on assembling, and further reduce the thickness of the display panel 03.

In some embodiments of the present application, the groove body 214 includes a first side wall 2141, a second side wall 2142, and a bottom wall 2143. The first side wall 2141 extends from an end of the bottom plate 213 to a side away from the display panel 03. The second side wall 2142 extends from an end of the second side plate 212 to a side away from the display panel 03. The bottom wall 2143 is fixedly connected with the first side wall 2141 and the second side wall 2142. The circuit board 22 is fixed to a surface of the bottom wall 2143 close to the display panel

03, and the surface of the bottom wall 2143 close to the display panel 03 is parallel to the display panel 03.

According to the display device 01 provided in the present application, the first side wall 2141, the second side wall 2142, and the bottom wall 2143 define the groove A. Since the circuit board 22 is fixed on the surface of the bottom wall 2143 facing toward the display panel 03, and the surface of the bottom wall 2143 facing toward the display panel 03 is parallel to the display panel 03, a fixing surface on which the circuit board 22 is positioned is ensured to be flat. Thus, the circuit board 22 is fixed effectively, and the stability on the assembly of the display device 01 is ensured.

In some embodiments of the present application, the display device 01 further includes a driving board 04 disposed on a side of the back plate 213 away from the display panel 03, and the circuit board 22 and the driving board 04 are electrically connected through a first connection line L1. The driving board 04 is positioned on a side of the first side wall 2141 away from the second side wall 2142, the first side wall 2141 is provided with a through-hole B, and the first connection line L1 extends through the through-hole B.

According to the display device 01 provided in the present application, the driving board 04 is, for example, a system-level chip (SOC). Since the through-hole B is provided in the first side wall 2141, and the first connection line L1 electrically connected to the circuit board 22 can pass through the through-hole B in the first side wall 2141, the circuit board 22 is electrically connected with the driving board 04. The difficulty on wiring of the first connection line L1 is reduced, and the space for wiring is saved.

At the same time, by providing the through-hole B, the heat generated by the circuit board 22 in operation can dissipate to the outside of the back plate 21 through the through-hole B, thereby improving the heat dissipation efficiency and safety performance of the display device 01. Alternatively, a plurality of through-holes B may be provided on the first side wall 2141, and at least one of the plurality of through-holes B may be configured as a connection hole for connecting the circuit board 22 and the driving board 04.

In some embodiments of the present application, the back plate 21 further includes a projection 215, and the projection 215 is provided on a side of the bottom plate 213 away from the display panel 03 and on a side of the driving board 04 away from the first side wall 2141. The projection 215, the first side wall 2141, and the bottom plate 213 between the projection 215 and the first side wall 2141 define a receiving space C. The driving board 04 is disposed in the receiving space C.

According to the display device 01 provided in the present application, the projection 215 provided on a side of the driving board 04 away from the first side wall 2141 can define the accommodating space C with the first side wall 2141, and the bottom plate 213 between the protruding portion 215 and the first side wall 2141. As such, the driving board 04 provided in the accommodating space C can be protected by the projection 215 and the first side wall 2141, thereby preventing the display device 01 in use from being damaged in function due to the external force pressing the display device 01, and thereby improving the stability of the display device 01.

In some embodiments of the present application, the projection 215 includes a support plate 2151, a distance between the support plate 2151 and the plane in which the display panel 03 is positioned is equal to a distance between the bottom wall 2143 and the plane in which the display panel 03 is positioned. The display device 01 further includes a base 05 including a driving cover plate 51, an orthographic projection of the driving cover plate 51 on the driving board 04 covers the driving board 04, and the driving cover plate 51 is fixedly connected with the support plate 2151 and the bottom wall 2143, respectively.

According to the display device 01 provided in the present application, since the distance between the support plate 2151 and the plane in which the display panel 03 is positioned is equal to the distance between the bottom wall 2143 and the plane in which the display panel 03 is positioned, the driving cover plate 51 respectively fixedly connected with the support plate 2151 and the bottom wall 2143 can be better attached to the support plate 2151 and the bottom wall 2143. As such, the driving cover plate 51 can better cover the driving board 04 in the accommodating space C, to better protect the driving board 04, to ensure the stability of the driving board 04, and to prolong the service life of the display device 01.

In some embodiments of the present application, the base 05 further includes a bracket 52 integrally formed with the driving cover plate 51.

In related arts, the rear housing and the bracket 52 of the display device 01 are assembled separately. That is, the bracket 52 is assembled in a second process after the rear housing is assembled. Therefore, there is a disadvantage over the large number of components and the complicated assembly.

According to the display device 01 provided in the present application, since the bracket 52 and the driving cover plate 51 are integrally formed, the components of the display device 01 are reduced, thereby improving the efficiency of assembly.

Further, according to the present application, a closed structure on the back side of the closed display device 01 is directly defined by the driving cover plate and the back plate 21. As such, the driving cover plate 51 can function as a rear housing in the related arts. Thus, the layout area of the display device 01 is reduced, the costs on the material is reduced, and the heat dissipation efficiency of the display device 01 is improved.

In some embodiments of the present application, the bracket 52 includes a first bracket 521 and a second bracket 522, and the first bracket 521 is fixedly connected with the driving cover plate 51 and the second bracket 522. A slide rail D is provided on the second bracket 522. The display device 01 further includes a support rod M1, an end of the support rod M1 is rotatably connected to the first support frame 521, and the other end of the support rod M1 is slidable in the slide rail D.

According to the display device 01 provided in the present application, since an end of the support rod M1 is rotatably connected to the first support frame 521, and the other end of the support rod M1 is slidable in the slide rail D, the first support frame 521 can be rotated with respect to the second support frame 522 by sliding the support rod M1 in the slide rail D. Therefore, the support frame 52 can be folded and unfolded. When the support frame 52 is in the folded state, the space occupied by the support frame 52 can be reduced, so that it is more convenient to take out and put in the support frame 52, and the assembly efficiency can be improved. In an embodiment, the slide rail D is provided with a plurality of engagement structures. As the other end of the support rod M1 engages with different engagement structures, the angle defined between the first bracket 521 and the second bracket 522 is changed, so that the display angle of the display device 01 can be adjusted, thereby improving user experience.

In some embodiments of the present application, the backlight module 02 further includes a reflective sheet 23, a light-guiding plate 24, an optical film 25, a middle frame 26, and a light bar 27. The reflective sheet 23 is disposed on a side of the bottom plate 213 close to the display panel 03. The light-guiding plate 24 is provided on a side of the reflective sheet 23 close to the display panel 03. The optical film 25 is provided on a side of the light-guiding plate 24 close to the display panel 03. The middle frame 26 includes a first portion 261 disposed between the light-guiding plate 24 and the second side plate 212, and a second portion 262 disposed on a side of the optical film 25 close to the display panel 03. The light bar 27 is fixed on a side of the first portion 261 close to the light-guiding plate 24. The display panel 03 is fixedly connected with the first side plate 211 and the second portion 262, respectively. A second connection line L2 is provided at an end of the display panel 03 close to the second side plate 212, and a gap E is provided between the first portion 261 and the second side plate 212. The second connection line L2 passes through the gap E to electrically connect to the circuit board 22.

According to the display device 01 provided in the present application, by providing the gap E between the first portion 261 and the second side plate 212, the second connection line L2 provided at the end of the display panel 03 close to the second side plate 212 passes through and electrically connects to the circuit board 22 smoothly, thereby ensuring the stable connection between the circuit board 22 and the display panel 03.

Further, a light-shielding tape is provided between the light bar 27 and the first portion 261, and the light bar 27 is fixed to aside of the first portion 261 close to the light-guiding plate 24 by the light-shielding tape. Similarly, a light-shielding tape is provided between the second portion 262 and the optical film 25, and the second portion 262 is fixed to a side of the optical film 25 close to the display panel 03 by the light-shielding tape.

Further, the first portion 261 is fixed to a side of the second side plate 212 close to the light-guiding plate 24, and the first portion 261 can be fixedly connected to the second side plate 212 by a glue block.

Further, the first side plate 211 includes an extension portion extending toward the second side plate 212, and an end of the display panel 03 is fixedly disposed on the extension portion. The orthographic projection of the extension portion on the light-guiding plate 24 overlaps with the orthographic projection of the optical film 25 on the light-guiding plate 24, so that the extension portion limits the optical film 25.

In some embodiments of the present application, the first side plate 211, the second side plate 212, the bottom plate 213, and the groove body 214 are integrally formed.

According to the display device 01 provided in the present application, since the first side plate 211, the second side plate 212, the bottom plate 213, and the groove body 214 are integrally formed, the back plate 21 can have a reduced number of components, the assembly efficiency of the display device 01 can be improved, and the manufacturing cost can be reduced.

In an embodiment, the projection 215 is integrally formed with the first side plate 211, the second side plate 212, the bottom plate 213, and the groove body 214.

In some embodiments of the present application, the display device 01 further includes a front frame 28, an end of the front frame 28 is fixedly connected to the display panel 03 and the other end of the front frame 28 is fixedly connected to the second side plate 212. The front frame 28 can connect the display panel 03 and the back plate 21 fixedly, thereby further improving the assembly stability of the display device 01.

In a second aspect, the present application further provides an assembly method for the display device 01, which can effectively improve the assembly efficiency of the display device 01.

Figure 4:
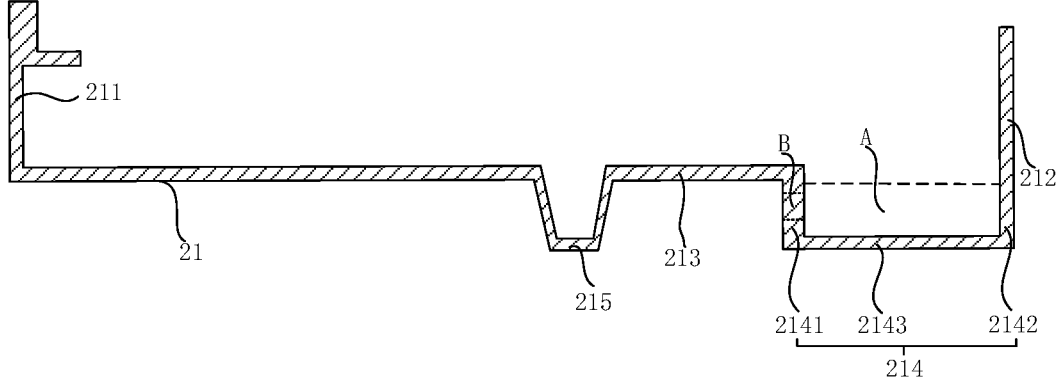
FIG. 4 is a schematic diagram of a structure corresponding to step S01 of an assembly method for a display device according to an embodiment of the present application.
Figure 5:
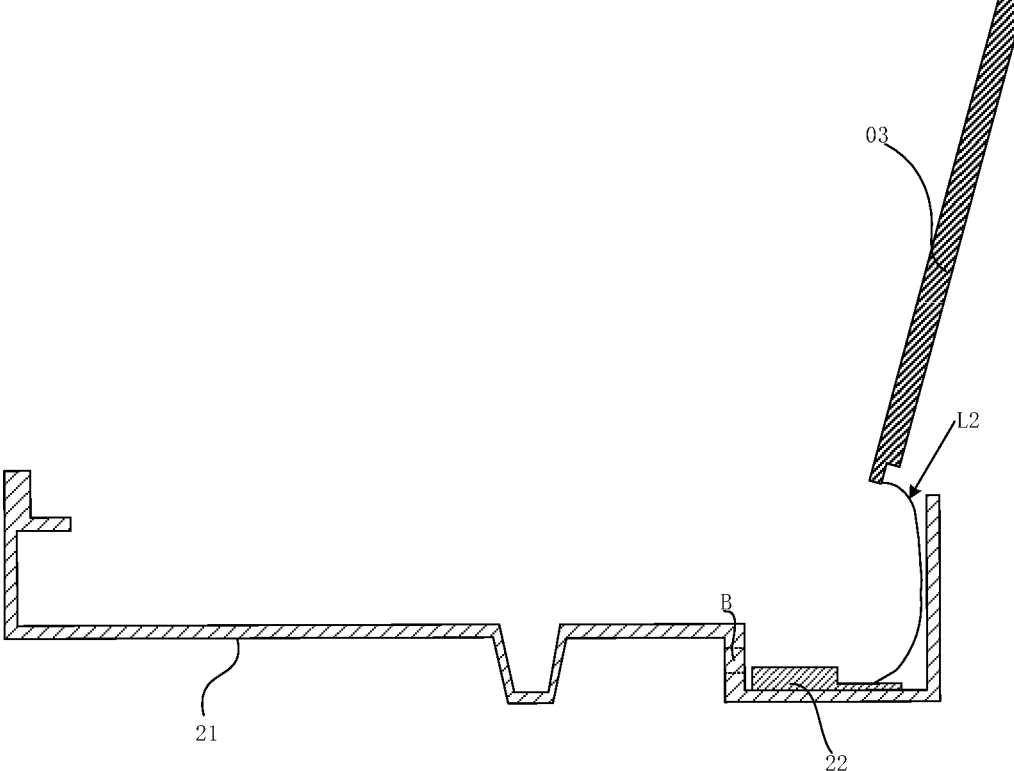
FIG. 5 is a schematic diagram of a structure corresponding to step S02 of an assembly method for a display device according to an embodiment of the present application.
Figure 6:
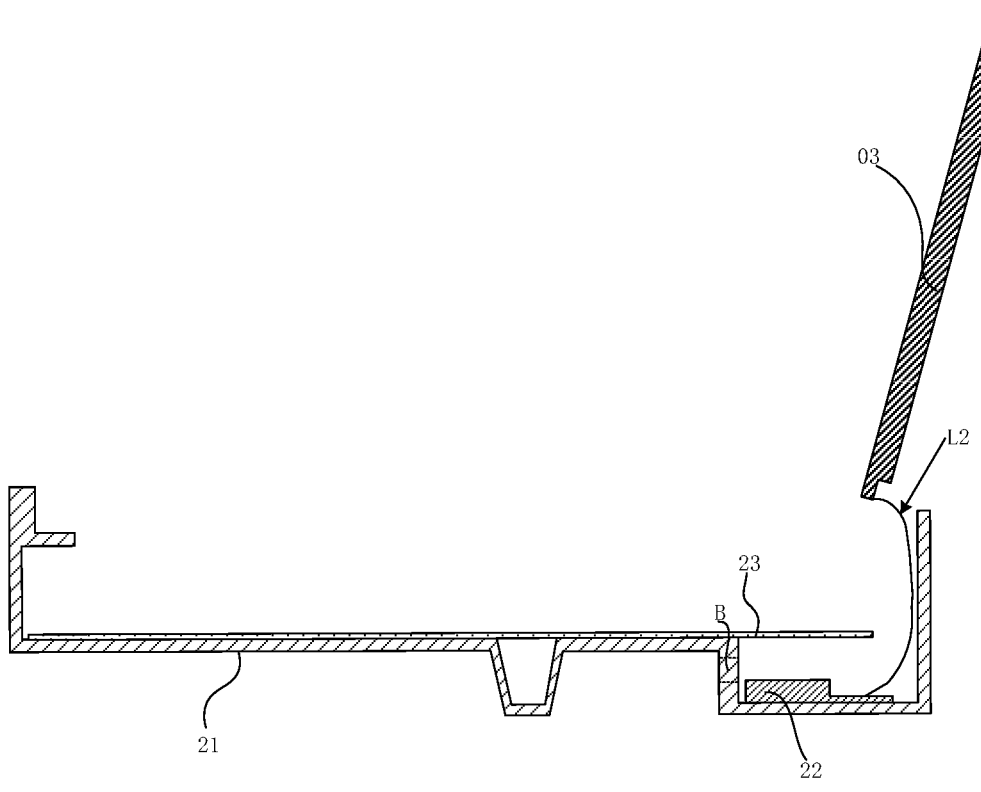
FIG. 6 is a schematic diagram of a structure corresponding to step S03 of an assembly method for a display device according to an embodiment of the present application.
Figure 7:
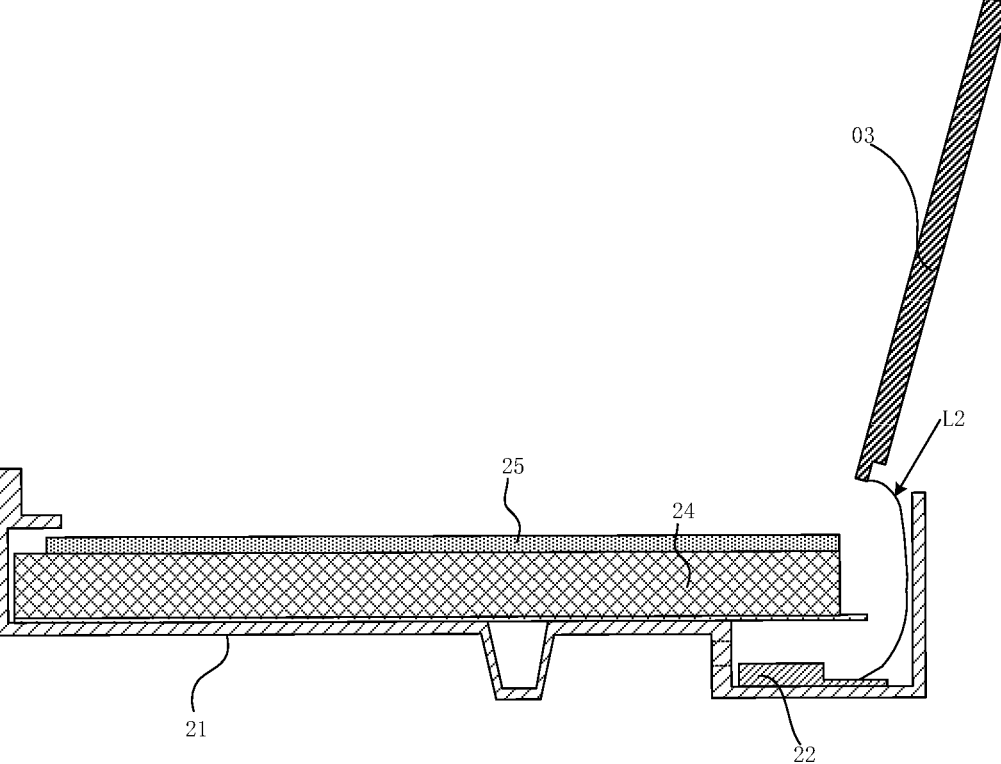
FIG. 7 is a schematic diagram of a structure corresponding to step S04 of an assembly method for a display device according to an embodiment of the present application.
Figure 11:
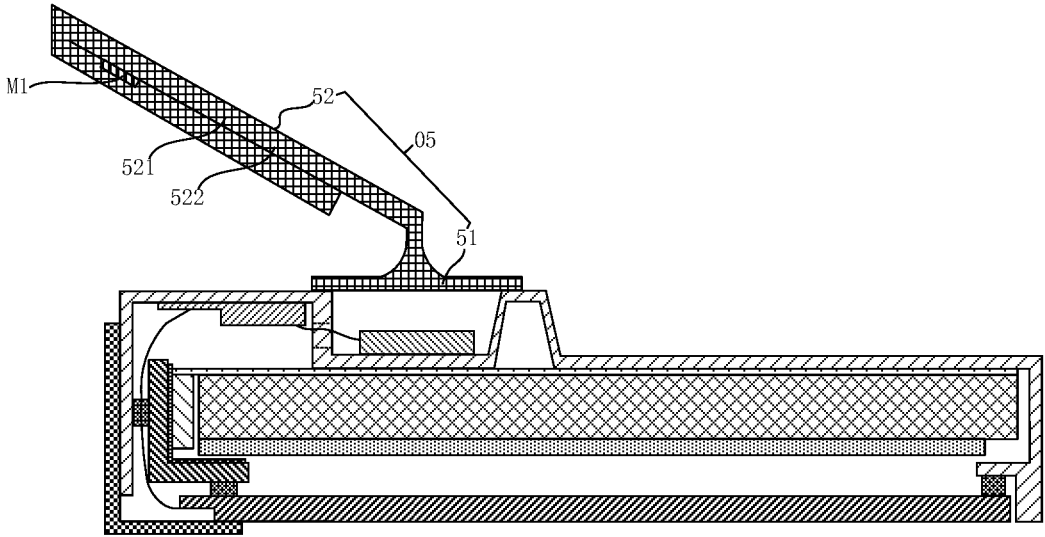
FIG. 11 is schematic diagram of a structure corresponding to step S08 of an assembly method for a display device according to an embodiment of the present application.

Specifically, FIG. 4 is a schematic diagram of a structure corresponding to step S01 of an assembly method for a display device according to an embodiment of the present application; FIG. 5 is a schematic diagram of a structure corresponding to step S02 of an assembly method for a display device according to an embodiment of the present application; FIG. 6 is a schematic diagram of a structure corresponding to step S03 of an assembly method for a display device according to an embodiment of the present application; FIG. 7 is a schematic diagram of a structure corresponding to step S04 of an assembly method for a display device according to an embodiment of the present application; FIG. 8 is a schematic diagram of a structure corresponding to step S05 of an assembly method for a display device according to an embodiment of the present application; FIG. 9 is a schematic diagram of a structure corresponding to step S06 of an assembly method for a display device according to an embodiment of the present application; FIG. 10 is a schematic diagram of a structure corresponding to step S07 of an assembly method for a display device according to an embodiment of the present application; and FIG. 11 is a schematic diagram of a structure corresponding to step S08 of an assembly method for a display device according to an embodiment of the present application. As shown in FIG. 4 to FIG. 11, the assembly method for the display device includes the following steps.

S01: providing a back plate 21, wherein the back plate 21 includes a first side plate 211; a second side plate 212 disposed opposite to the first side plate 211; a bottom plate 213; and a groove body 214; the bottom plate 213 is provided on a side of the first side plate 211 close to the second side plate 212, and is fixedly connected to the first side plate 211; the groove body 214 is provided between the bottom plate 213 and the second side plate 212, and is fixedly connected to the bottom plate 213 and the second side plate 212, respectively; the groove body 214 has a groove A, and the groove A is positioned on a side of the bottom plate 213 away from the display panel 03.

S02: providing a circuit board 22 electrically connected to the display panel 03 in the groove A.

S03: providing a reflective sheet 23 on a side of the bottom plate 213 away from the circuit board 22.

S04: stacking a light-guiding plate 24 and an optical film 25 sequentially on a side of the reflective sheet 23 away from the bottom plate 213.

S05: providing a middle frame 26 including a first portion 261 and a second portion 262; wherein a light bar 27 is fixed to the first portion 261, the first portion 261 of the middle frame 26 is disposed on a side of the light-guiding plate 24 away from the first side plate 211, and the second portion 262 of the middle frame 26 is disposed on a side of the optical film 25 away from the light-guiding plate 24; wherein the light bar 27 is positioned between the first portion 261 and the light-guiding plate 24.

S06: fixing the display panel 03 to sides of the first side plate 211 and the second portion 262 away from the bottom plate 213.

S07: providing the driving board 04 on a side of the bottom plate 213 away from the display panel 03, and electrically connecting the driving board 04 with the circuit board 22.

S08: providing a base 05 on a side of the driving board 04 away from the bottom plate 213, wherein the base 05 includes an integrally formed structure of a driving board 04 and a bracket 52, and a driving cover plate 51 is fixedly connected with the back plate 21.

The present application provides a display device and an assembly method for display device. The display device includes a backlight module, and a display panel provided on a light-emitting side of the backlight module. The backlight module includes a back plate including a first side plate, a second side plate, and a bottom plate. The second side plate is disposed opposite the first side plate. The bottom plate is provided on a side of the first side plate close to the second side plate, and is fixedly connected to the first side plate. The groove body is provided between the bottom plate and the second side plate, and is fixedly connected to the bottom plate and the second side plate, respectively. The groove body has a groove on a side of the bottom plate away from the display panel. The backlight module further includes a circuit board disposed in the groove. According to the display device provided in the present application, since the back plate includes the groove body, and the circuit board is directly disposed in the groove of the groove body, it is possible to reduce the number of components in the backlight module, reduce the assembly cost, and reduce the thickness of the display panel.

The embodiments of the present application are described in detail with reference to a display device and an assembly method for display device. The principles and implements of the present application are described based on the specific examples herein. The above embodiments are merely to help understand the method and the core of the present application. At the same time, variations will occur to those skilled in the art in both the detailed embodiments and the scope of application in accordance with the teachings of the present application. In view of the foregoing, the present description should not be construed as limiting the application.

What is claimed is:

1. A display device, wherein the display device comprises a backlight module, and a display panel disposed on a light-emitting side of the backlight module; wherein the backlight module comprises a back plate comprising:

a first side plate;

a second side plate disposed opposite to the first side plate;

a bottom plate provided on a side of the first side plate facing toward the second side plates and fixedly connected to the first side plate; and a groove body provided between the bottom plate and the second side plate, wherein the groove body is fixedly connected with the bottom plate and the second side plate, respectively, the groove body has a groove on a side of the bottom plate away from the display panel;

wherein the backlight module further comprises a circuit board, the circuit board is electrically connected with the display panel, and the circuit board is disposed in the groove;

wherein the groove body comprises:

a first side wall extending from an end of the bottom plate and extending away from the display panel;

a second side wall extending from an end of the second side plate and extending away from the display panel; and a bottom wall fixedly connecting the first side wall and the second side wall;

wherein the circuit board is fixed on a surface of a side of the bottom wall facing toward of the display panel, and the surface of the side of the bottom wall facing toward the display panel is parallel to the display panel;

wherein the display device further comprises a driving board provided on a side of the back plate away from the display panel, and the circuit board and the driving board are electrically connected by a first connection line;

wherein the driving board is positioned on a side of the first side wall away from the second side wall, the first side wall is provided with a through-hole, and the first connection line passes through the through-hole.

2. The display device of claim 1, wherein the back plate further comprises a projection provided on a side of the bottom plate away from the display panel, and the projection is positioned on a side of the driving board away from the first side wall;

wherein the projection, the first side wall, and a bottom plate between the projection and the first side wall define a receiving space, and the driving board is disposed in the receiving space.

3. The display device of claim 2, wherein the projection comprises a support plate, a distance between the support plate and a plane in which the display panel is positioned is equal to a distance between the bottom wall and the plane in which the display panel is positioned;

wherein the display device further comprises a base, the base comprises a driving cover plate, an orthographic projection of the driving cover plate on the driving board covers the driving board, and the driving cover plate is fixedly connected with the support plate and the bottom wall, respectively.

4. The display device of claim 3, wherein the base further comprises a bracket integrally formed with the driving cover plate.

5. The display device of claim 4, wherein the bracket comprises a first bracket and a second bracket, the first bracket is fixedly connected with the driving cover plate and the second bracket, and a slide rail is provided on the second bracket;

wherein the display panel further comprises a support rod, an end of the support rod is rotatably connected to the first bracket, and another end of the support rod is slidable in the slide rail.

6. The display device of claim 1, wherein the backlight module further comprises:

a reflective sheet disposed on a side of the bottom plate facing toward the display panel;

a light-guiding plate disposed on a side of the reflective sheet facing toward the display panel;

an optical film disposed on a side of the light-guiding plate facing toward the display panel;

a middle frame comprising a first portion and a second portion, wherein the first portion is disposed between the light-guiding plate and the second side plate, and the second portion is disposed on a side of the optical film facing toward the display panel; and a light bar fixed on a side of the first portion facing toward the light-guiding plate;

wherein the display panel is fixedly connected with the first side plate and the second portion, respectively; a second connection line is provided at an end of the display panel facing toward the second side plate; a gap is defined between the first portion and the second side plate; and the second connection line passes through the gap to electrically connect with the circuit board.

7. The display device of claim 6, wherein the backlight module further comprises a front frame, an end of the front frame is fixedly connected with the display panel, and another end of the front frame is fixedly connected with the second side plate.

8. The display device of claim 1, wherein the first side plate, the second side plate, the bottom plate, and the groove body are integrally formed.

9. The display device of claim 8, wherein the backlight module further comprises:

a reflective sheet disposed on a side of the bottom plate facing toward the display panel;

a light-guiding plate disposed on a side of the reflective sheet facing toward the display panel;

an optical film disposed on a side of the light-guiding plate facing toward the display panel;

a middle frame comprising a first portion and a second portion, wherein the first portion is disposed between the light-guiding plate and the second side plate, and the second portion is disposed on a side of the optical film facing toward the display panel; and a light bar fixed to a side of the first portion facing toward the light-guiding plate;

wherein the display panel is fixedly connected with the first side plate and the second portion, respectively; a second connection line is provided at an end of the display panel facing toward the second side plate; a gap is defined between the first portion and the second side plate; and the second connection line passes through the gap to electrically connect with the circuit board.

10. The display device of claim 9, wherein the backlight module further comprises a front frame, an end of the front frame is fixedly connected with the display panel, and another end of the front frame is fixedly connected with the second side plate.

11. The display device of claim 8, wherein the groove body portion includes:

a first side wall extending from an end of the bottom plate and extending away from the display panel;

a second side wall extending from an end of the second side plate and extending away from the display panel; and a bottom wall fixedly connecting the first side wall and the second side wall;

wherein the circuit board is fixed on a surface of a side of the bottom wall facing toward of the display panel, and the surface of the side of the bottom wall facing toward the display panel is parallel to the display panel.

12. A display device, wherein the display device comprises a backlight module, and a display panel disposed on a light-emitting side of the backlight module; wherein the backlight module comprises a back plate comprising:

a first side plate;

a second side plate disposed opposite to the first side plate;

a bottom plate provided on a side of the first side plate facing toward the second side plates and fixedly connected to the first side plate; and a groove body provided between the bottom plate and the second side plate, wherein the groove body is fixedly connected with the bottom plate and the second side plate, respectively, the groove body has a groove on a side of the bottom plate away from the display panel;

wherein the backlight module further comprises a circuit board, the circuit board is electrically connected with the display panel, and the circuit board is disposed in the groove;

wherein the first side plate, the second side plate, the bottom plate, and the groove body are integrally formed;

wherein the groove body portion includes:

a first side wall extending from an end of the bottom plate and extending away from the display panel;

a second side wall extending from an end of the second side plate and extending away from the display panel; and a bottom wall fixedly connecting the first side wall and the second side wall;

wherein the circuit board is fixed on a surface of a side of the bottom wall facing toward of the display panel, and the surface of the side of the bottom wall facing toward the display panel is parallel to the display panel;

wherein the display device further comprises a driving board provided on a side of the back plate away from the display panel, and the circuit board and the driving board are electrically connected by a first connection line;

wherein the driving board is positioned on a side of the first side wall away from the second side wall, the first side wall is provided with a through-hole, and the first connection line passes through the through-hole.

13. The display device of claim 12, wherein the back plate further comprises a projection provided on a side of the bottom plate away from the display panel, and the projection is positioned on a side of the driving board away from the first side wall;

wherein the projection, the first side wall, and a bottom plate between the projection and the first side wall define a receiving space, and the driving board is disposed in the receiving space.

14. The display device of claim 13, wherein the projection comprises a support plate, a distance between the support plate and a plane in which the display panel is positioned is equal to a distance between the bottom wall and the plane in which the display panel is positioned;

wherein the display device further comprises a base, the base comprises a driving cover plate, an orthographic projection of the driving cover plate on the driving board covers the driving board, and the driving cover plate is fixedly connected with the support plate and the bottom wall, respectively.

15. The display device of claim 14, wherein the base further comprises a bracket integrally formed with the driving cover plate.

16. The display device of claim 15, wherein the bracket comprises a first bracket and a second bracket, the first bracket is fixedly connected with the driving cover plate and the second bracket, and a slide rail is provided on the second bracket;

wherein the display panel further comprises a support rod, an end of the support rod is rotatably connected to the first bracket, and another end of the support rod is slidable in the slide rail.

17. An assembly method for display device, comprising:

providing a back plate, wherein the back plate comprises a first side plate, a second side plate disposed opposite to the first side plate, a bottom plate, and a groove body; the bottom plate is provided on a side of the first side plate facing toward the second side plate and is fixedly connected to the first side plate; the groove body is provided between the bottom plate and the second side plate, and is fixedly connected to the bottom plate and the second side plate, respectively; the groove body has a groove on a side of the bottom plate away from the display panel;

providing a circuit board electrically connected to the display panel in the groove;

providing a reflective sheet on a side of the bottom plate away from the circuit board;

stacking a light-guiding plate and an optical film sequentially on a side of the reflective sheet away from the bottom plate;

providing a middle frame including a first portion and a second portion, wherein a light bar is fixed to the first portion, the first portion of the middle frame is disposed on a side of the light-guiding plate away from the first side plate, and the second portion of the middle frame is fixed on a side of the optical film away from the light-guiding plate, and the light bar is positioned between the first portion and the light-guiding plate;

fixing the display panel to sides of the first side plate and the second portion away from the bottom panel;

providing a driving board on a side of the bottom plate away from the display panel, and electrically connecting the driving board to the circuit board; and providing a base on a side of the driving board away from the bottom plate, wherein the base comprises an integrally formed structure of a driving cover plate and a bracket, and the driving cover plate is fixedly connected to the back plate.

* * * * *